G. F. HURT.
PULVERIZING MILL.
APPLICATION FILED MAY 31, 1917.

1,334,701.

Patented Mar. 23, 1920.
4 SHEETS—SHEET 1.

WITNESSES:

INVENTOR.
G. F. Hurt
BY
Rogers, Kennedy Campbell
ATTORNEYS.

G. F. HURT.
PULVERIZING MILL.
APPLICATION FILED MAY 31, 1917.

1,334,701.

Patented Mar. 23, 1920.
4 SHEETS—SHEET 4.

WITNESSES:

INVENTOR.
G. F. Hurt
By Rogers, Kerr & Campbell
ATTORNEYS.

UNITED STATES PATENT OFFICE.

GEORGE FLETCHER HURT, OF NEW YORK, N. Y.

PULVERIZING-MILL.

1,334,701.     Specification of Letters Patent.     Patented Mar. 23, 1920.

Application filed May 31, 1917. Serial No. 171,919.

*To all whom it may concern:*

Be it known that I, GEORGE F. HURT, a citizen of the United States, residing at New York, in the county of New York and State of New York, have invented certain new and useful Improvements in Pulverizing-Mills, of which the following is a specification, reference being had therein to the accompanying drawing.

This invention relates to grinding or pulverizing mills for pulverizing or reducing various materials, the invention being especially concerned with that type of mill in which the material is acted on between a fixed grinding ring or surface and a series of grinding rolls which revolve within the ring and which operate against the same to subject the material to a pulverizing action.

The invention consists of various improved features of construction designed to render the mechanism compact in form, simple and durable in construction and effective in operation, which features will be fully described in the specification to follow and the novel parts of which will be pointed out in the appended claims.

Figure 1:
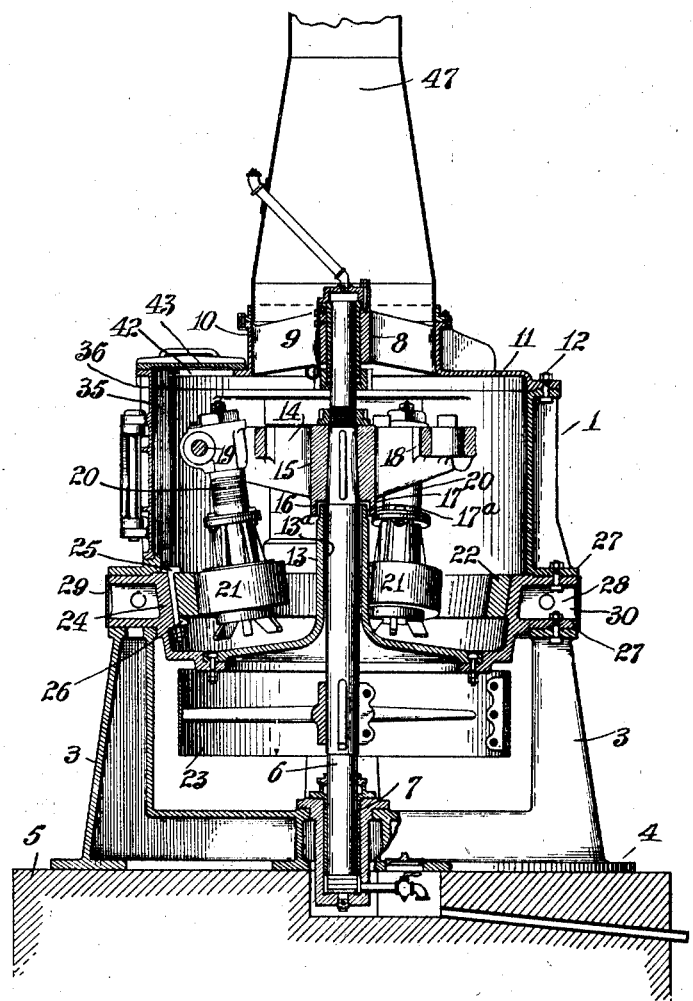
Figure 1 is a vertical central sectional elevation through a grinding mill having my invention embodied therein.
Figure 2:
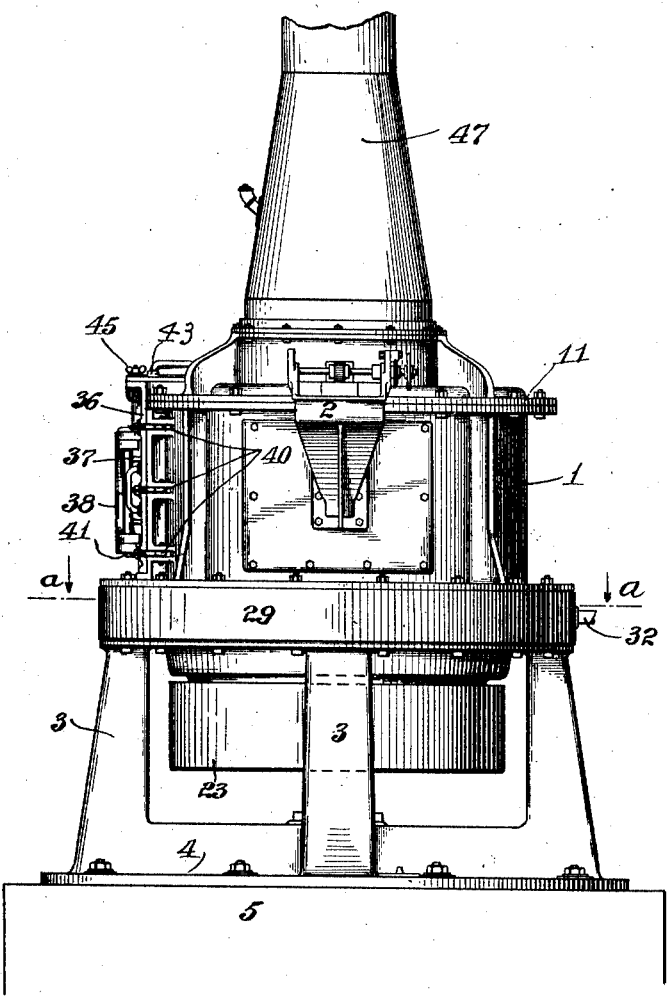
Fig. 2 is a side elevation of the same.
Figure 3:
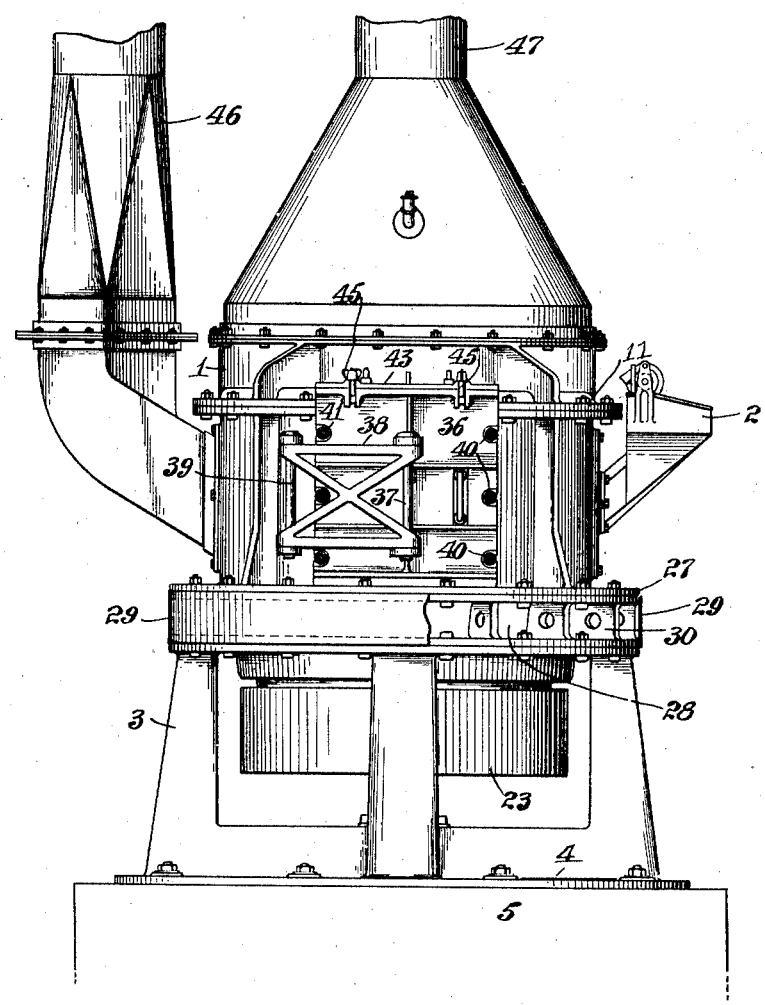
Fig. 3 is a similar view taken at right angles to that of the preceding figure.
Figure 4:
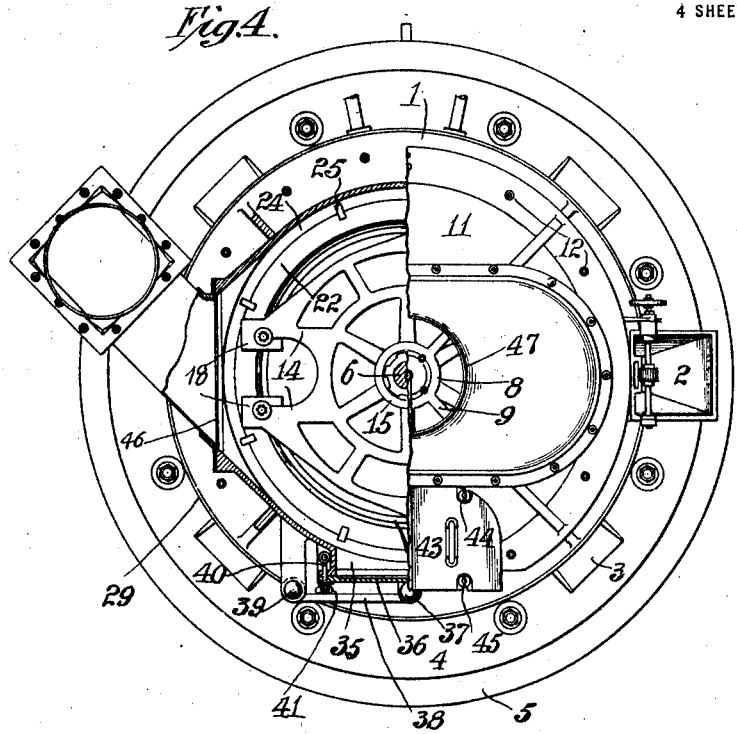
Fig. 4 is a top plan view of the mill half in section.
Figure 5:
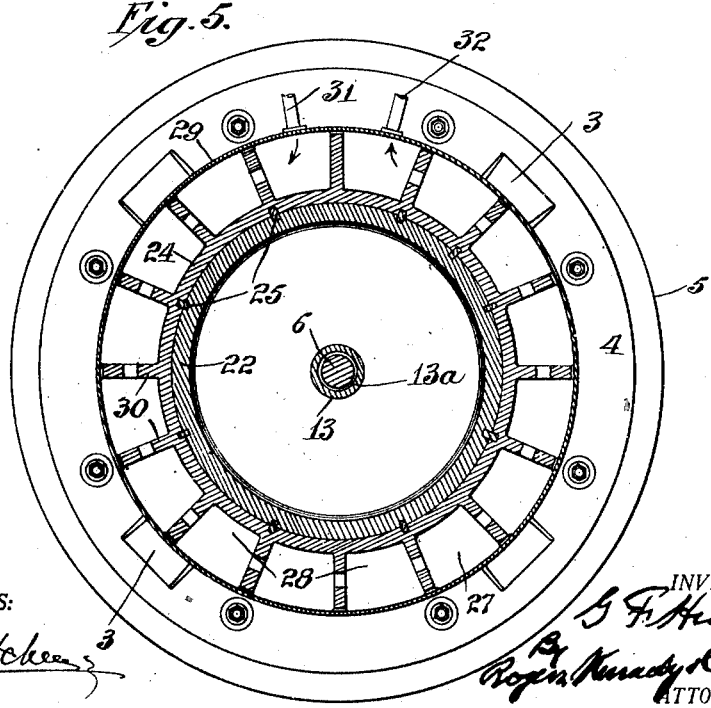
Fig. 5 is a horizontal section taken on the line *a—a* of Fig. 2.

Referring to the drawings:

1 designates a cylindrical casing or chest inclosing a grinding chamber within which the operative parts of the mechanism are inclosed, and into which the material to be reduced is fed, in the present instance through a hopper 2 discharging through the side of the casing. The casing is fixedly supported on the upper ends of standards or pillars 3 rising from a bed plate 4 supported on a suitable foundation 5 whereby the bottom of the casing is supported some distance above the bed-plate, the purpose of which will presently appear. Extending centrally through the casing is a rotary vertical shaft 6 mounted at its lower end in a step bearing 7 in the bed plate, and mounted at its upper end in a bearing 8 sustained by the inner ends of radial arms 9 having their outer ends connected with a collar 10 extending upwardly from an annular cover plate 11 applied to the upper end of the casing and detachably connected thereto by means of fastening bolts 12, or by other suitable releasable fastening means. The bottom of the casing is extended upwardly at its center into the grinding chamber in the form of an axial neck 13, the internal diameter of which is slightly larger than the diameter of the shaft, whereby an annular space 13$^a$ is left surrounding the shaft, which space communicates at its lower end with the external atmosphere and at its upper end with the interior of the grinding chamber for the purpose to be more fully described hereinafter. Carried by the shaft within the chamber near its upper end, is a horizontal head or frame 14 which is provided at its center with a hub 15 keyed to the shaft, the bore of the hub at its lower end being enlarged as at 16, thereby forming in effect an annular axially extending depending flange 17 which surrounds the upper end of the neck 13 and is spaced therefrom as at 17$^a$ so that communication is established between the upper end of the annular space 13$^a$ and the interior of the grinding chamber. At intervals the horizontal frame 14 is provided with pairs of ears 18 and between the ears of each pair is pivoted by means of a removable horizontal pivot pin 19, the upper end of a stem 20, there being in the present instance three of these stems, which by reason of the pivotal connection of their upper ends with the frame as described, are free to move at their lower ends radially of the axis of the shaft toward and from the same, the stems being thus pendulously supported by the revolving frame and being detachable therefrom. The stems terminate at their lower ends adjacent the bottom of the chamber and have journaled thereon, cylindrical grinding rollers 21, constituting in connection with the stems grinding instrumentalities, the rollers being in such position that they will, in the rotation of the shaft, travel in grinding relation to the inner surface of a surrounding grinding ring 22 sustained in fixed relations to the interior of the casing near the base of the same. The grinding ring is preferably of conical form with its inner surface sloping upwardly and outwardly from the axis of rotation of the shaft, and the stems are so supported by the revolving frame that when the rollers are in grinding relation to the ring, the peripheral surface of the rollers will contact approximately throughout the vertical extent of the ring, the cylindrical form of the rollers and the conical form of the ring causing a slip between the coöperating grinding surfaces which is very effective in crushing the material acted on.

Below the bottom of the casing the shaft has releasably fixed to it a driving pulley 23 by means of which rotary motion may be imparted to the shaft from any suitable source of power, the shaft in its motion carrying the pendulous crushing rollers around in the grinding chamber and causing them by centrifugal force to swing outwardly and grind and pulverize the material against the grinding ring.

The grinding ring seats against a conical or flaring surface or seat 24 on the interior of the casing, and is held detachably but firmly in place by suitable means, in the present instance, by means of hook bolts 25 extending in upright grooves in the seat with their upper hooked ends engaging over the upper edge of the ring. At their lower ends the bolts have clamping nuts screwed thereon, which engage ears 26 extending inwardly from the casing beneath the ring. By this means the ring may be drawn down and held to its seat in firm and fixed relations, and may be readily removed for repairs or for the insertion of a new ring, by first removing the nuts from the end of the bolts and withdrawing the latter upwardly from the grooves to disengage the ring.

The exterior of the casing horizontally opposite the grinding ring is formed with upper and lower horizontal outwardly projecting parallel flanges 27, thereby forming between them an annular chamber 28 which is closed at its outer side by means of a ring 29 fastened to the outer edges of the flanges and constituting the outer wall of the chamber, the inner wall of which is constituted by the seat for the grinding ring. This chamber is separated into compartments by means of vertical radial partitions 30 extending between the flanges, each partition having an opening therethrough by means of which the several compartments communicate with each other throughout the extent of the chamber. The purpose of this chamber is to provide for the circulation of a cooling medium in proximity to the grinding ring in order to prevent the ring from becoming unduly or injuriously heated. The cooling medium, which may be water, is introduced into one of the compartments by means of a supply pipe 31 and after passing through the series of compartments through the openings in the several partitions, the water finds its exit through a discharge pipe 32 entering the compartment in the chamber adjacent that where the water entered.

In the particular form of the casing illustrated, the bottom of the casing is formed separate from the upper portion of the same, the said bottom having formed thereon the outwardly extending flanges 27, the upper one of which is seated against a horizontal annular flange projecting outwardly from the lower end of the upper part of the casing and detachably connected therewith by the bolts 33, while the lower flange is seated against the upper ends of the pillars 3 and detachably connected therewith by the bolts 34, this sectional construction enabling the parts of the casing to be separated from each other for repairs or renewal and convenient shipment. It is manifest, however, that as far as the provision of the cooling chamber in proximity to the grinding ring is concerned, the casing may be otherwise constructed, and the bottom may be formed in one piece with the upper portion.

In order that access may be gained to the interior of the grinding chamber for inspection of the operative mechanism, more particularly the grinding instrumentalities and grinding ring, so that repairs may be made to these parts, or that they may be removed, I provide in the side of the casing a vertical opening 35 closed by a door 36. This opening extends from the top of the grinding ring to the upper end of the casing and is of a size sufficient to permit the pendulous stems to be removed therethrough. The door consists of a vertical plate pivotally connected about midway between its ends by means of a vertical pivot bolt 37 to the inner end of a vertical frame 38, which is pivotally connected at its outer end, by means of a vertical pivot bolt 39, to the outer side of the casing, whereby the door may be swung outwardly from the casing to uncover the opening by swinging the frame 38 on its axis, and may be then swung out of the way by pivoting the door on the axis 37. The door when in closed position is held firmly in place so as to properly seal the opening by means of clamping bolts 40 pivoted at their inner ends to the casing at intervals around the opening therein, and adapted when swung inwardly to enter open slots in the edge of the door, wing nuts 41 being screwed on the outer ends of the bolts and engaging the edges of the door at the sides of the slots therein. By the provision of this door free access is permitted to the interior of the grinding chamber to the operative mechanism inclosed therein, and by rotating the shaft, the pendulous grinding rolls may be brought opposite the opening, and, if desired, may be removed therethrough.

The annular cover plate 11 on the upper end of the casing is provided with an opening 42 therethrough, communicating at its front with the vertical opening 35, the opening 42 being closed by a detachable lid 43 which seats at its side and rear edges against the edge of the opening, and which seats at its forward edge against the upper edge of the door 36. Clamping bolts 44 are pivoted at intervals to the edge of the opening in the cover plate and are adapted to be swung into open slots in the edge of the lid to confine the same firmly down on the annular plate, while additional clamping bolts 45 are pivoted to the upper edge of the door 36 and are adapted to be swung into open notches in the forward edge of the lid to bind the edge of the latter down on the upper edge of the door, these several clamping bolts being provided with nuts to engage the lid and apply clamping pressure thereto. The purpose of this opening 42 is to permit access to the upper ends of the stems carrying the grinding rollers, so that they may be inspected and the bearing parts properly lubricated.

By fastening the annular plate 11 detachably to the upper end of the casing, as hereinbefore described, provision is made for the ready dismantling of the apparatus and the convenient removal of the rotary shaft and connected parts. In removing these parts the annular plate is first detached, carrying with it the shaft bearing 8 and then the driving pulley 23 is released from the shaft. The shaft may then be lifted vertically through the upper end of the casing together with the horizontal frame and the grinding instrumentalities supported thereby, the lower end of the shaft in this action being withdrawn from the step bearing and through the driving pulley and the upwardly projecting neck on the bottom of the casing, the shaft in its passage through this neck being guided and maintained in vertical position, thereby preventing the same from tipping laterally and avoiding interference of the suspended grinding rolls with the interior of the casing. In re-assembling the parts, the lower end of the shaft is entered in the upper end of the neck and lowered centrally into position and seated in the step bearing, the neck in this action serving as before, to guide the shaft and maintain its central position so that its lowered end may be properly entered with accuracy into the step bearing without danger of injury thereto.

The removal of the pulverized material from the grinding chamber and the separation of this material from the coarser particles which have not been brought to their proper degree of fineness, is effected in the present instance by a system of air separation in which a circulation of air is maintained through the grinding chamber, the air being forced continuously into the base of the chamber through an opening 46 entering tangentially through the side thereof and in the direction of the rotation of the crushing rolls therearound. The air, with the pulverized particles and dust held in suspension, leaves the upper end of the chamber at its center through an up-take pipe 47, the lower end of which is fastened to the upper end of the vertical collar 10 surrounding the central opening in the annular plate 11, the said up-take pipe leading upwardly to the suction side of a suitable exhauster (not shown) which delivers the dust laden air to a dust collector chamber (also not shown) in which the pulverized material is collected, and the air from the dust collector freed of the pulverized material, being returned to the grinding chamber and entering the same through the inlet opening 46 before alluded to. A continuous circulation of air through the grinding chamber is thus effected and results in the continuous withdrawal of the pulverized material therefrom. This air separation system forms no part of the present invention except in so far as hereinafter indicated, and therefore it has not been deemed necessary to illustrate herein the air pressure apparatus and the dust collector. In the operation of such separating systems there is a slight leakage of air into the grinding chamber due to the imperfect sealing of the latter, and in accordance with my invention this leakage of the air is so far controlled that it will serve to maintain the external parts of the apparatus, more particularly the driving pulley and the exposed bearing beneath the grinding chamber, free of dust, which in the operation of the apparatus is liable to escape from the grinding chamber and to collect on these parts. This object is effected by the annular air space 13ª before alluded to, surrounding the shaft between the same and the interior of the neck 13, which space, it will be remembered, communicates at its lower end with the atmosphere and at its upper end with the interior of the grinding chamber. The air flowing rapidly from the outside through this space, carries with it such dust as may be present in the outside air beneath the casing and delivers the same into the grinding chamber and thereby prevents its accumulation on the exposed parts of the mechanism at this point.

In the accompanying drawings and foregoing description I have disclosed my invention in the particular form and detailed construction which I prefer to adopt, but it will be understood that various changes may be made in these details, and that the construction may be variously modified without departing from the limits of my invention provided the operation is substantially as above set forth; and it will be further understood that the invention is not limited to any particular form or construction of the parts except in so far as such limitations are specified in the claims.

Having thus described my invention, what I claim is:

1. In a pulverizing mill, the combination of a fixed casing inclosing a grinding chamber and provided with a bottom which includes a hollow neck extending upwardly into the chamber, a rotary shaft extending through and above and below the neck, the interior of the neck being of larger diametral dimensions than those of the exterior of the shaft to leave an air space of substantial proportions between them which communicates respectively with the external air and with the grinding chamber, and grinding instrumentalities carried by the shaft within the grinding chamber, said casing being provided with supply and discharge openings for the connection of an air-circulating system; whereby the fine material escaping from the chamber will, by the air flowing through the neck, be drawn from the mill and, thus, be prevented from collecting on the external parts of the mechanism.

2. In a pulverizing mill, the combination of a fixed casing inclosing a grinding chamber and formed with a bottom which includes a hollow neck extending upwardly into the chamber, a rotary shaft extending through and above and below the neck and spaced therefrom to leave an annular airspace of substantial proportions surrounding the shaft and communicating at its lower end with the external air and at its upper end with the grinding chamber, a bearing for the shaft situated below the casing, and grinding instrumentalities carried by the shaft within the chamber, said chamber being provided with air and discharge openings for the connection of an air-circulating system; whereby the passage of air from the outside will flow through the neck and into the grinding chamber and, thus, prevent the collection of dust on the external parts of the mechanism.

3. In a pulverizing mill, the combination of a fixed casing inclosing a grinding chamber and formed on its interior with a sloping annular seat, a removable grinding ring having a sloping external surface seated against the casing-seat, upright clamping bolts sustained by the casing between the seat and the grinding ring and provided on their upper ends with inwardly-extending hooks for engaging the upper end of the ring whereby the latter may readily be removed from the casing, and nuts screwed on the lower ends of the bolts and engaging the casing beneath the ring.

4. In a pulverizing mill, the combination of a fixed casing and cover plate applied thereto and inclosing a grinding chamber, a rotary member in said chamber, grinding instrumentalities carried by the rotary member and detachable therefrom, said casing being provided with a side opening extending from its upper end downwardly, and said cover plate being provided with an opening extending from its outer edge inwardly and communicating at its outer end with the opening in the casing, said two openings conjointly forming a passageway through which the grinding instrumentalities after being detached from the rotary member, may be removed bodily from the chamber in an upright position, and doors closing said openings.

5. In a pulverizing mill, the combination of a fixed casing inclosing a grinding chamber and provided with a bottom which includes a hollow neck which extends upwardly into the chamber, a rotary shaft extending through and above and below the neck, the interior of the neck being of larger diametral dimensions than those of the exterior of the shaft to leave an air space of substantial proportions between them which communicates respectively with the external air, a frame carried by the shaft above the upper end of the neck and provided with a depending annular flange surrounding the upper end of the neck and spaced therefrom to form a substantial passage communicating at its upper end with the said air space and at its lower end with the grinding chamber, and grinding instrumentalities carried by the frame, said casing being provided with supply and discharge openings.

In testimony whereof, I have affixed my signature.

GEORGE FLETCHER HURT.